(12) United States Patent
Aliakseyeu et al.

(10) Patent No.: US 11,150,101 B2
(45) Date of Patent: Oct. 19, 2021

(54) DEVICE FOR POSITIONING INFORMATION AT A LOCATION IN AN IMAGE

(71) Applicant: SIGNIFY HOLDING B.V., Eindhoven (NL)

(72) Inventors: Dzmitry Viktorovich Aliakseyeu, Eindhoven (NL); Jérôme Eduard Maes, Eindhoven (NL); Dirk Valentinus René Engelen, Heusden-Zolder (BE); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/632,493

(22) PCT Filed: Jul. 16, 2018

(86) PCT No.: PCT/EP2018/069254
§ 371 (c)(1),
(2) Date: Jan. 20, 2020

(87) PCT Pub. No.: WO2019/016132
PCT Pub. Date: Jan. 24, 2019

(65) Prior Publication Data
US 2020/0200559 A1    Jun. 25, 2020

(30) Foreign Application Priority Data

Jul. 20, 2017 (EP) ..................................... 17182250

(51) Int. Cl.
*G06T 19/00* (2011.01)
*G06K 9/00* (2006.01)
(Continued)

(52) U.S. Cl.
CPC .......... *G01C 21/36* (2013.01); *G06F 16/587* (2019.01); *G06K 9/00671* (2013.01);
(Continued)

(58) Field of Classification Search
None
See application file for complete search history.

(56) References Cited

U.S. PATENT DOCUMENTS 8,947,513 B2 *  2/2015  Ganick ................ H04N 5/2357
                                                      348/61
9,576,460 B2 *  2/2017  Dayal ..................... G08B 21/02
(Continued)

FOREIGN PATENT DOCUMENTS

JP     2008-199569 A     8/2008
JP     2010-014408 A     1/2010
(Continued)

OTHER PUBLICATIONS

Kari Rye Schougaard et al., "Indoor Pedestrian Navigation Based on Hybrid Route Planning and Location Modeling," Department of Computer Science, University of Aarhus, Denmark, Ervasive Computing, 2012 (18 Pages), Jun. 2012.

*Primary Examiner* — Joni Hsu (57) ABSTRACT

It is an object of the invention to provide an improved device for positioning information at a location in an image. Hence the invention provides a device (100) for positioning information (18) at a location (17) in an image (13), the device (100) comprising: a detector (10) for recording the image (13), the image (13) comprising a light source (14), wherein a lighting characteristic (15) of the light source (14) comprises a code (16) indicative of the information (18) and the
(Continued)

location (17) where to position the information (18) in the image (13); a processor (11) arranged for processing the image (13) to retrieve the code (16), retrieving the information (18) indicated by the code (16), retrieving the location (17) indicated by the code (16), processing the image (13) into a processed image (19) by positioning the information (18) at the location (17) in the image (13); an image rendering device (12) for rendering the processed image (19).

13 Claims, 3 Drawing Sheets (51) Int. Cl.
  *H04W 4/029* (2018.01)
  *G01C 21/36* (2006.01)
  *G06F 16/587* (2019.01)
  *G06T 11/60* (2006.01)
(52) U.S. Cl.
  CPC .......... *G06K 9/00805* (2013.01); *G06T 11/60* (2013.01); *H04W 4/029* (2018.02)

(56) References Cited

U.S. PATENT DOCUMENTS

| | | |
|---|---|---|
| 2008/0010134 A1* | 1/2008 | Musumeci ......... G06Q 30/0274 705/14.7 |
| 2010/0156933 A1 | 6/2010 | Jones et al. |
| 2011/0161875 A1 | 6/2011 | Kankainen |
| 2012/0224060 A1* | 9/2012 | Gurevich .................. B60R 1/00 348/148 |
| 2015/0242804 A1 | 8/2015 | Brown |
| 2015/0255021 A1 | 9/2015 | Wu et al. |
| 2015/0279022 A1* | 10/2015 | Shuster ................... G06T 7/593 345/427 |
| 2015/0331238 A1* | 11/2015 | Roth ..................... G06F 3/0481 348/115 |
| 2016/0037506 A1 | 2/2016 | Cheng et al. |
| 2016/0042563 A1 | 2/2016 | Ur et al. |
| 2016/0231134 A1* | 8/2016 | Nguyen Kim ..... G01C 21/3638 |

FOREIGN PATENT DOCUMENTS

| | | |
|---|---|---|
| JP | 2016-537792 A | 12/2016 |
| JP | 2017-519184 A | 7/2017 |
| KR | 1020140031539 A | 3/2014 |
| WO | 2015077766 A1 | 5/2015 |

* cited by examiner

DEVICE FOR POSITIONING INFORMATION AT A LOCATION IN AN IMAGE

CROSS-REFERENCE TO PRIOR APPLICATIONS

This application is the U.S. National Phase application under 35 U.S.C. § 371 of International Application No. PCT/EP2018/069254, filed on Jul. 16, 2018, which claims the benefit of European Patent Application No. 17182250.5, filed on Jul. 20, 2017. These applications are hereby incorporated by reference herein.

FIELD OF THE INVENTION

The invention relates to a device for positioning information at a location in an image. The invention further relates to a method of positioning information at a location in an image; to a system comprising said device and a light source; to a computer program product; and to a light source for positioning information at a location in an image, the image being recorded, processed and displayed by a device.

BACKGROUND OF THE INVENTION

Devices providing augmented reality become more available to a mass audience due to recent technological advances. Augmented reality devices, such as e.g. eligible smartphones, cameras, heads-up displays, smart glasses, etc., will even become more widespread in the near future.

A goal of augmented reality applications is to overlay information on top of the physical view. With more augmented reality applications, more visual clutter may be caused in the augmented view. Said visual clutter is undesired, as it may be disadvantageous. For example, visual clutter may limit obtaining a functional overview of information; visual clutter may limit physical safety during activities assisted with augmented reality view; visual clutter may reduce visual ergonomics; visual clutter may undesirably block an essential part of the real world in augmented reality view; etc.

View management may solve said disadvantages by managing the information provided in the augmented reality view. A solution is for example provided by US2011/0161875A1, wherein an approach is disclosed for decluttering a mapping display. Namely, a system is disclosed with the capability of: selecting one or more Points of Interests (POIs) on a cluttered mapping display (e.g. an augmented reality display with multiple nearby POIs), capturing an image of the mapping display, and then overlaying the selected POIs as a list or other format for distinctly rendering each POI. With this approach, said system disclosed in US2011/0161875A1, can distinctly render and declutter one or more of the POIs that are visible or present in a particular mapping display. Similarly, another kind of Augmented Reality information management is found in US2016/042563A1 and US2015/242804A1.

Although the invention disclosed in US2011/0161875A1 provides an approach for decluttering information present in an augmented reality view, wherein the user actively has to select the mapped information to render, said approach still remains limited in automation, efficiency and application, for example to improve safety during physical activities and/or navigation.

Hence, as the application of augmented reality becomes more widespread, a clear need is present to declutter the augmented reality view more efficiently and effectively.

SUMMARY OF THE INVENTION

It is an object of the invention to provide an improved device for positioning information at a location in an image, which at least alleviates one of the disadvantages mentioned above. Thereto, the invention provides a device for positioning information at a location in an image, the device comprising: a detector for recording the image, the image comprising a light source, wherein a lighting characteristic of the light source comprises a code indicative of the information and the location where to position the information in the image; a processor arranged for processing the image to retrieve the code, retrieving the information indicated by the code, retrieving the location indicated by the code, processing the image into a processed image by positioning the information at the location in the image; an image rendering device for rendering the processed image.

Such a device is positioning information at a location in an image by an inventive concept, because a lighting characteristic of a recorded light source comprises a code indicative of the information and indicative of the location where to position the information in the image. Said code is retrieved by processing the image. Consequently, the information and the location, both indicated by the code, may be retrieved, such that the image may be processed into a processed image by positioning the information at the location in the image. An image rendering device may subsequently render the processed image.

Hence, by merely recording the image with the detector, the device is prompted by the lighting characteristic of the light source to position the indicated information at the indicated location in the image. The light source may therefore manage the view of the device. The device may be part of an augmented reality device, such that the light source may prompt a decluttering of information in a view of the augmented reality device; or may prompt a layout of information still to be rendered in a view of the augmented reality device. Hence, the invention provides an advantageously powerful, straightforward and inventive concept in automated view management.

For clarification, a non-limiting example may for example be: A detector of the device according to the invention may record an image comprising a light source at a hazardous and crowded intersection. A lighting characteristic of the light source, e.g. a Visible Light Communication (VLC) based modulated light, may comprise a code indicative of the information and the location where to position the information in the image. Here, for example, safety considerations may lay at the basis for specifically determining said code to indicate positioning navigation information at the upper left corner of the (recorded) image, wherein the image may be part of an augmented reality view, e.g. a heads up display with a rendered augmented view. As a result, by the present invention, the light source at the hazardous and crowded intersection may manage the view of a device according to the invention, which records an image of the light source, e.g. for use in augmented reality view (during navigating across the intersection). Thus, for example, the recorded light source determines what information to position at which location in the augmented reality view of an augmented reality device.

The advantage of the device according the invention, as mentioned before and as will be further elucidated (e.g. in examples) below, is that an improved device is provided for positioning information at a location in an image; because a light source comprised within a recorded image may determine what information to position where in a processed image, hence e.g. in an augmented reality view. Thus, said processed image and/or said augmented reality view may be advantageously managed by a light source to declutter and/or to layout information. A further advantage is that a light source according to the invention may be widespread and strategically positioned in city or building infrastructure. Thus, the specific distribution of various light sources in city infrastructure (e.g. street lighting or façade lighting) may advantageously be used to manage the view of e.g. augmented reality devices. Hence, the widespread nature of lighting infrastructure may advantageously be utilized for improving safety and providing ergonomics for devices according to the invention, such as augmented reality devices.

A further advantage is that dedicated locations may be prompted by a light source for positioning the information, which prevents e.g. augmented reality information to block other parts of the image or the view, and which may also help experienced users to more easily find information as such users may have learned where such information will be located by each light source.

As a result, an automated, a more effective, and a more efficient device is provided for positioning information at a location in an image, hence for managing a view, e.g. an augmented reality view.

Said device may e.g. be part of an augmented reality device, a virtual reality device, a heads-up display, a projector device, a smartphone, a smart glass, an interactive visor, a navigation device, or a tablet. Said device may also comprise multiple separate components forming a single device in combination or in connection; for example each component comprising a transceiver to communicate amongst each other, e.g. the detector, processor and/or image rendering device communicating by wireless connection such as Wi-Fi, Bluetooth, ZigBee or RF.

The corresponding image rendering device may be a display. The display may be a LED display, or LCD, CRT, OLED, AMOLED, super AMOLED or Retina. The display may moreover be a touchscreen, a 3-D screen or a holographic display. Said image rendering device may moreover be a projection device, wherein a projection may be provided on e.g. a display, a screen, a window, a glass, a transparent material such as a polymer or ceramic, a lens, or an eye. Said image rendering device may moreover be a heads-up display; vehicle window eligible for rendering an image, such as a laser projection; or a glass of a smart glass.

The detector may be a photodetector, such as preferably a camera arranged for recording images, or a light diode arranged for recording and/or reconstructing an image based on received light.

The image being recorded by the detector may be a photograph, a set of photographs or a video. The image may comprise a format. The image may comprise an edge defining the contour and/or size of the image. Said edge and/or contour may serve as a frame, for example as a frame of reference for positioning information in the image, or as a frame in which the image may be processed. The image may be further processed into a transparent image.

The processor may comprise a local memory for storing the information, the location, the code, the image, or the processing of the image. The processor may comprise computational power to decode the code comprised within the lighting characteristic of the light source, which is comprised within the image. The processor may moreover comprise computational power to process the recorded image into different types of images, such as a photograph, a plurality of photographs, a video, or other mappings of features observed in the image, such as heat mapping or frequency mapping. The processor may moreover comprise computational power to perform image processing and/or image editing.

As mentioned, the processor is arranged for processing the image into a processed image by positioning the information at the location in the image. Said processed image may e.g. either be the recorded image onto which the information is positioned at the location, or said processed image may e.g. be a new image, associated with the recorded image, onto which the information is positioned at the location. The former may for example relate to a smartphone display, wherein an image of reality is recorded and the recorded image is displayed with the information positioned at the location according to the invention, resulting in a processed image. The latter may for example relate to a heads-up display device, wherein an image of reality is recorded and the recorded image is e.g. merely used for determining the location where to position the information, and subsequently for positioning the information in a new image, resulting in a processed image comprising the information but not the original recorded image. Such a processed image is dedicated to projection devices; and may in this example be projected by the heads-up display device. Hence, in such a case, the processor may be arranged for processing the image into a processed image by positioning the information at the location in the image and/or at the location associated with the image. Consequently, the invention is advantageously applicable to all devices ranging from physical display devices to projection devices.

As mentioned before, a device is provided for positioning information at a location in an image. The lighting characteristic of the recorded light source comprises a code indicative of the information and indicative of the location where to position the information in the image.

Said light source may be emitting light, hence a lighting characteristic, in operation. Said light source may be a semiconductor lighting device, such as a LED, an OLED, a LED strip, a TLED, a pixilated LED spot. A semiconductor lighting device may advantageously be miniaturized, be implemented, be durable, and may advantageously be able to provide a code, such as by means of VLC. The light source may in some examples be a conventional incandescent light source, such as a light bulb, a fluorescent light source, or a halogen spot. The light source may also comprise optics such as a light guide, lenses, reflectors or filters, or (adjustable) covers. The light source may also be or comprise fluorescent materials, such as fluorescent paint, e.g. as applied in traffic.

Said lighting characteristic may be from the group of color, intensity, color temperature and modulation. The lighting characteristic may also be caused by an indirect effect of emitted light, such as a shade, a pattern or a visual border caused by a footprint of a light source.

Said image comprising said light source may, in examples, refer to an image wherein the physical source of the light is not visible, but the resulting light is visible (i.e. e.g. light effect, light footprint, lighting characteristic), such that the code may be received. For example, a wall washer may not be present when decoding the wall washing light on a wall recorded in an image. Thus, said image comprising said light source may, in examples, be said image comprising said emitted (or resulting) light of a light source.

The code comprised within the lighting characteristic of the light source may refer to either a code communicated by means of invisible light such as Infrared or Radio Frequency, or to Visible Light Communication (VLC). Visible Light Communication is the communication of data by means of a signal embedded in visible light. To be more specific, the data may embedded by modulating a property of visible light, typically the intensity, according to any suitable modulation technique. Based on the modulations, the information in the 'coded light' may be detected using a photodetector. Moreover, the code comprised within the emitted light may further relate to a color coding scheme.

Further, the code is indicative of the information and the location where to position the information in the image. The code may for example comprise an identifier. Said identifier may e.g. be both indicative of the location and the information. For example, identifying a particular light source at the hazardous and crowded intersection (as given in the example before) may be indicative of the location and the information, i.e. the identifier may be used in further processing steps to derive the location and the information. Such a code may be computationally efficient, as the code may be limited to merely an identifier indicative of the information and the location, while the location and the information may be retrieved by a backend system.

Moreover, the code may for example explicitly comprise the location where to position the information in the image, wherein the code may comprise a string in the coding of the code indicating the location, such as e.g. defined in coordinates. The location may for example be a relative position within a scalable frame of an image, e.g. upper left corner of a square frame of an image, top 5% of a rectangular frame of an image with aspect ratio 4:3, right halve of a rectangular frame of an image with aspect ratio 16:9, position X;Y in a square frame of an image wherein the lower left corner is the origin, etc. Hence, the code may define the location. The location may, in examples, be explicitly defined in the code as mentioned.

Moreover, the code may for example explicitly comprise the information, wherein the code comprises a string in the coding of the code indicating the information, such as e.g. said string defining a type of the information or a group of the information. Hence, the information may be a label indicating a type of the information or group of the information. For example, the string indicating the information as 'navigation information'. Alternatively, in some examples, in case computational power is available, the code may not only provide the information, as defined in the invention, but also provide a content of the information. For example, the string indicating the information as 'navigation information' may also provide a content such as navigational directions relative to the device. Hence, the code may, in examples, define the information. The information may, in examples, be explicitly defined in the code as mentioned.

The code is retrieved by processing the image. The location, as indicated by the code, may be retrieved by the processor.

First: It may for example be advantageous to retrieve the location from a database comprising a list indicating locations corresponding to codes. For example, the code may comprise an identifier of the light source, which may be used to retrieve the corresponding location from said database. Hence, in an embodiment, the processor is arranged for retrieving the location indicated by the code by accessing a database comprising a list indicating locations corresponding to codes; and retrieving the location corresponding to the code from the list in the database. Such an embodiment is advantageous for reducing the computational effort to process the image for retrieving the code, because the code may be shorter. Also the light source emitting the code may require less processing effort. Another advantage of such a database is that the list indicating the locations corresponding to the codes may be updated more effectively and uniformly. Namely, an input may be provided as a preference to alter entries in the list indicating locations corresponding to codes.

Said database may be comprised within an external server. For example, the database may be hosted by a server related to a set of light sources, such as city lighting, street lighting, neighborhood lighting, or building lighting. Said database may be comprised within a light pole, or light source object. Said database may also be hosted in another device, such as a smartphone, tablet, smart wearable device, or a computer. Said database may also be part of a server hosting social media. Said external server may further comprise an input means for altering entries in the list indicating locations corresponding to codes. Said external server may be updated during a single updating session, such that the codes correspond to updated desired locations.

For example, such a database may be downloaded on the device from an external location (e.g. a cloud), or may be populated by user entries for creating said list. The device may therefore comprise user input means for providing said user entries. This is advantageous, because a user, using the device according to the invention, may enable its own preferences with respect to where to position the information in the image; hence enable its own preferences with respect to view management of the device, which may be an augmented reality device.

The device may comprise a transceiver to communicate with said database. Said communication may be performed wirelessly by means of Wi-Fi, Bluetooth, ZigBee, RF, GSM, or VLC.

Said database may also be comprised within a memory of the device according to the invention, wherein the processor may access the memory to retrieve the list indicating locations corresponding to codes. Said memory may be integrated and part of the processor, such as a local working memory. Hence, in an embodiment, the device according to the invention is provided, wherein the device comprises the database. Such an embodiment is advantageous, because the device may autonomously retrieve the location by accessing a database and retrieving the location corresponding to the code. In such cases, the code may be shorter, because the code does not have to explicitly comprise the location, which is computationally advantageous.

Second: As partly mentioned before, the location, as indicated by the code, may be retrieved by the processor. In some examples, the location may advantageously be provided by the code itself; which provides the light source with more control over the device by means of the code comprised within the lighting characteristic of the light source. Hence, in an embodiment, the processor is arranged for retrieving the location indicated by the code by processing the code; wherein the location is comprised within the code. Thus, the code may directly (explicitly) indicate, or define, or determine, the location where to position the information in the image. The code may be a data signal wherein said location is encoded with relative or general coordinates in relation to the parameters of the detector, the image or the device. For example, in a non-limiting case, the code may comprise a general command for a location indicated relatively by 'the upper 20 percent of the size of a recorded image'. Other examples may be provided.

As mentioned before, a device is provided for positioning information at a location in an image. The lighting characteristic of the recorded light source comprises a code indicative of the information and indicative of the location where to position the information in the image. Said code is retrieved by processing the image. The information, as indicated by the code, may be retrieved by the processor.

As partly mentioned before, the code indicative of the information means that the code comprises a data string (in the coding of the code) indicating the information. Indicating the information comprises indicating the type of the information, or indicating information of a particular type. As a result, the device may position the information, being of a particular type, at a location in the image. To ensure e.g. safety and/or ergonomics, for example in augmented reality view, the device according to the invention may be advantageously suitable for positioning information of a particular type at a location in an image. Hence, in an embodiment, the information comprises at least one of: navigation information, touristic information, advertorial information, communication information, and device information. Further, a content of the information may be retrieved by the processor, for example as being generated, hosted, applied, created or received by the device.

Thus, as partly mentioned, the code may comprise an instruction which type of information to position where in the image. In examples, the instruction does not comprise the information of said type, but is obtained from another source.

Thus, as partly mentioned, the information may be information comprising a classifier, which classifier is indicative of the type of the information, such as e.g. navigation information, or advertorial information. As a result, the location where to position the information in the image means the location where to position the information comprising said classifier in the image; wherein said classifier is also indicated by the code of said light source.

Navigation information may comprise the information required for positioning, navigation, and/or location based services. It is advantageous to provide a device according to the invention, wherein the information is navigation information, because a clutter of navigation information in the processed image, e.g. in an augmented reality view, may be affecting safety. Thus, for safety considerations, the present invention provides an improved device for positioning navigation information at a location in an image.

Furthermore, as the light source prompts the rendering of the processed image by means of the present invention, hence the light source managing the navigation information a view, it is advantageous to use the present invention to position navigation information at a location in an image, because a light source is commonly widely present in a recorded image of the detector during navigation (e.g. street lighting). Thus, for example, the lighting infrastructure to manage the view of devices according to the invention, such as augmented reality devices, may be applicable widespread.

Touristic information may comprise: (i) city information, such as e.g. sightseeing suggestions, ratings, municipal news updates, institutional messages of city institutions, hotel data, addresses, pipeline and/or cable layouts in the city, city event information, tourist statistics, meeting point information, digital sticky notes of tourists, restaurant information, etc.; (ii) weather information, such as weather forecasts, radar views of the sky, presentation of local thermodynamic properties, clothing suggestions based on weather, etc.; (iii) housing information, such as hotel occupancy, inhabitant profiles, property values, etc.; (iv) sightseeing information, such as history information, opening times, photographs, movies, etc.; (v) payments, such as entrance fee payments, parking ticket payments, etc. As touristic information may be offered widespread, an augmented reality view may easily be cluttered. Hence, the device according to the present invention provides an inventive concept for positioning the touristic information at location in an image, such that e.g. an augmented reality view may be managed effectively, based on said code comprised in a lighting characteristic of the light source, which may be available widespread in relation to touristic activities.

Advertorial information may comprise: a digital billboard, shop information, advertorial photography or video, discount information, promotional information, voucher offerings, shopping lists, monetary transactions, etc. As it is expected that retail may overload augmented reality devices with information, it is also in the line of expectation that this may clutter a view of an augmented reality device. Hence, as mentioned before, the device according to the invention may provide a solution to said overload of information, because the device according to the invention may position information at a location in an image, based on a code comprised within a lighting characteristic of a light source. To be more specific, for example: A detector of the device according to the invention may record an image comprising a plurality of light sources at a crowded shopping street in a city. The image may comprise content of advertorial information. This may be many pop-up advertisements related to many shops in shopping street. Due to the crowded shopping street, said content (the pop-ups) of advertorial information may clutter the view in the image. A lighting characteristic of each of the plurality of light sources, e.g. a Visible Light Communication (VLC) based modulated light, may comprise a code indicative of the information and the location where to position the information in the image. Here, for example, a functional decluttering a view may lay at the basis for specifically determining said code to indicate positioning advertorial information only at the bottom 5% of the recorded image, wherein the image may be part of an augmented reality view. As a result, by the present invention, each of the plurality of light sources in the shopping street may effectively manage the view of a device according to the invention, such that said image comprising content of advertorial information is not cluttered by it. Said plurality of light sources may for example be street lighting or shop window lighting.

Communication information may comprise: a telephone book; call information, such as a telephone call, or a video call; texting information; rendering of communicative application features; mail information, or notification messages.

Device information may comprise: device status information, power consumption information, sensor information, external device coupling information, or an application menu. To be more specific, for example: A device according to the invention may be part of an augmented reality device viewing a sightseeing object. The augmented reality view may comprise device information indicating the power consumption of the device, some menu icons, and other sensor reading information. Such device information may be in view. Although not cluttering the view, it may be undesired to render said device information, because it may be desired to have a clean view of the sightseeing object. Therefore, the sightseeing object may comprise a light source comprising a lighting characteristic comprising a code indicative of the information and the location where to position the information in the image. Here, the information is the device information, the location may be the lower left corner of the image, being e.g. merely 3% of the total screen surface.

As mentioned before, a device is provided for positioning information at a location in an image, wherein the image comprises a light source, wherein a lighting characteristic of the light source comprises a code indicative of the information and the location where to position the information in the image. In an embodiment, the location is defined as a position relative to a position of the light source in the image. Such an embodiment is advantageous, because the light source may be a suitable anchor point for defining the location where to position the information in the image. The position relative to a position of the light source in the image may thus be a distance offset from the light source in the image. Further, as the code is retrieved by processing the image, the position of the light source in the image may be processed already, hence it may be computationally efficient to define the location as a position relative to a position of the light source in the image.

Furthermore, in an embodiment, the location is defined as a position in the image coinciding with the position of the light source in the image. Such an embodiment is advantageous, because the position of the light source in the image may, by the very nature of the placement of the light source in the real environment, be a suited position to anchor, or to coincide with, a specific (type of) information. For example, in the real environment, sign posts and/or light poles are being used to present various types of information, such as address information and direction information. Hence, when decluttering a view, the view being established e.g. by the image in the present invention, it may be advantageous to position e.g. address information or directions information at the position in the image coinciding with the position of the light source in the image. This may render ergonomics for the user of the device and improved use of the device. Here, coinciding may be overlapping.

Hence, in an embodiment, the device according to a corresponding example of the invention is provided, wherein processing the image into a processed image comprises positioning navigation information at the location in the image, wherein the location is defined as a position in the image coinciding with the position of the light source in the image; and wherein the light source is part of street lighting infrastructure. It is advantageous to provide navigation information at the position in the image coinciding with the position of the light source in the image, because, as the light source is part of street lighting infrastructure, the navigation information is positioned at the most ergonomic position in the image. For example, when navigating on a highway, it may be advantageous to specifically position the navigation information coinciding with the light source of the street lighting infrastructure, such as a sign post light source, because a user navigating (and making use of the device of the invention) may by experience in the real world consider said position as ergonomic (as a sign post is already in place, but now serves as a beneficial anchor for the user for positioning the information).

In an embodiment, the location is defined as a position relative to an edge of the image rendering device. Such an embodiment is advantageous, as the image rendering device may comprise various shapes, but as the edge of the image rendering device is physically determined to be stationary, associating the location to a position relative to an edge of the image rendering device may provide improved ergonomics.

In an embodiment, the processor is arranged for processing the image into a processed image by making the image fully transparent. Hence, such an embodiment may be advantageous in case the processed image is projected onto a heads-up display, wherein a feature of the detected image is not required to be displayed on the heads-up display because the heads-up display comprises a see through window showing the real feature corresponding to said feature of the detected image. Providing transparency, such as making the image fully transparent, may improve the computational efficiency of the image rendering device and/or the device according to the invention.

In an embodiment, the light source may be part of at least one of: street lighting infrastructure, façade lighting, indoor lighting, and entertainment lighting. Such light sources may be widespread and may be advantageously be associated with a particular type of information. For example, street lighting infrastructure may be advantageously implemented in the present invention for positioning navigation information; similarly façade lighting for advertorial information, tourist information, or city information; similarly entertainment lighting for tourist information; similarly indoor lighting for device information.

Further, in an embodiment, the device according to the invention provided, wherein the device is further arranged for positioning a further information at a further location in the image, wherein the code is indicative of the further information and the further location where to position the further information in the image; wherein the processor arranged for retrieving the further information indicated by the code, retrieving the further location indicated by the code, further processing the image into the processed image by positioning the further information at the further location in the image. In an embodiment, said further information may comprise at least one of: navigation information, touristic information, advertorial information, communication information, and device information. In an embodiment, the information is navigation information and the further information is communication information; or the information is navigation information and the further information is advertorial information; or the information is advertorial information and the further information is communication information; or the information is touristic information and the further information is device information. Alternatively, specific combinations may be envisioned based on the context of the environment the device is present in.

As a result of such an embodiment, the processed image rendered by the image rendering device may host both the information at the location in the processed image, and the further information at the further location in the processed image. This is advantageous, as ergonomics indicate that two types of information may be better located in a particular arrangement with respect to each other. For example, notification information may be best indicated on the top part of a view, while communication information is best indicated on the bottom part of a view. For example, navigation information and advertorial information may be best suited on opposite sides of a view.

Further, in an embodiment, the device according to the invention is provided, wherein the location where to position the information in the image is further dependent on a physical parameter of the device; the processor is further arranged for retrieving a physical parameter of the device; and processing the image into a processed image by positioning the information at the location in the processed image, wherein the location is further dependent on the physical parameter. In an embodiment, the physical parameter is one of, location of the device, velocity of the device, and orientation of the device. Alternatively, the usage of the device may also be a physical parameter. Yet alternatively, said physical parameter may be a battery level of the device, or an application mode of the device, such as e.g. a discrete mode. Said embodiment may similarly be applied in a method according to the invention, wherein the steps of the method are associated with the features of said embodiment.

As a result of such an embodiment, a device is provided wherein the code is indicative of the location where to position the information in the image in dependence on the physical parameter. This enables to add an additional parameter or dimension to the positioning of information at a location in an image. For example, the velocity of the device may be detected and retrieved by the processor. The code may indicate that advertorial information may be positioned at upper left corner of an image when the device is moving with a velocity above a threshold, e.g. 1 m/s, and indicate that advertorial information may be positioned at the center of an image when the device is moving with a velocity below a threshold, e.g. 1 m/s or 0 m/s. Hence, when an user with an augmented reality device according to the invention is utilizing the augmented reality view to walk through a crowded shopping street, the device according to the invention may declutter the view of the users characterized by having a hurry (wherein the device comprises a velocity above a threshold) and position advertorial information in a more prominent view of an user characterized by not having a hurry (e.g. standing still in front of a shop). Here, the code is still comprised by a lighting characteristic of a light source comprised within the image detected/recorded. A similar example may be provided for a device according to the invention in association with a vehicle, wherein the velocities of a vehicle are higher, hence provide a higher threshold value, for example, 50 km/h, wherein the information is positioned at a different location in an image in dependence of the velocity. A similar example may also be provided with the orientation of the vehicle. For example, a car driving west during the time of day of sunset may provide a device according to the invention wherein the information may be positioned at a location A in an image in dependence of the west-orientation, while information may be positioned differently at a location B in an image in dependence of an opposite east-orientation. Said location A may for example advantageously make us of the sunset and its effects, while said location B may make use of not having a sunset for that orientation.

Moreover, considering the present embodiment, said location may be multiple locations, wherein the most suitable location, which is the location where to position the information in the image, is selected based on the physical parameter of the device.

It is a further object of the invention to provide an improved system for positioning information at a location in an image. Thereto, the invention further provides system for positioning information at a location in an image, the system comprising, the device according to the invention, and a light source. The advantages applying to the device according to the invention also apply to the system according to the invention.

In an embodiment, the light source may be part of at least one of: street lighting infrastructure, façade lighting, indoor lighting, and entertainment lighting.

It is a further object of the invention to provide an improved light source for positioning information at a location in an image. Thereto, the invention further provides a light source for positioning information at a location in an image, the image being recorded, processed and displayed by a device; the light source comprising a lighting characteristic comprising a code indicative of the information and the location where to position the information in said image recorded, processed and displayed by said device. The advantages applying to the device according to the invention also apply to the system according to the invention. Said device may be the device according to the (first aspect of the) invention.

In an embodiment, said light source may be part of at least one of: street lighting infrastructure, façade lighting, indoor lighting, and entertainment lighting.

In an embodiment, said light source may comprise a plurality of lighting units.

It is a further object of the invention to provide an improved method for positioning information at a location in an image. Thereto, the invention further provides a method for positioning information at a location in an image, the method comprising: recording the image, the image comprising a light source, wherein a lighting characteristic of the light source comprises a code indicative of the information and the location where to position the information in the image; processing the image to retrieve the code; retrieving the information indicated by the code; retrieving the location indicated by the code; processing the image into a processed image by positioning the information at the location in the image; displaying the processed image. The advantages applying to the device according to the invention, and the system according to the invention, may also apply to the method according to the invention defined here.

The method may be performed by the device for positioning information at a location in an image according to the invention.

In an embodiment, retrieving the location indicated by the code is done by: accessing a database comprising a list indicating locations corresponding to codes; and retrieving the location corresponding to the code from the list in the database. Such an embodiment is advantageous, because the device may autonomously retrieve the location by accessing a database and retrieving the location corresponding to the code.

In an embodiment, retrieving the location indicated by the code is done by: processing the code; wherein the location is comprised within the code. As the location may be provided by the code itself, no specific processing steps are required in the processor dedicated for this task. Further, the light source is advantageously provided with more control over the device by means of the code.

Similarly as mentioned before: In an embodiment, the location is defined as a position relative to a position of the light source in the image. Such an embodiment is advantageous, because the light source may be a suitable anchor point for defining the location where to position the information in the image. The position relative to a position of the light source in the image may thus be a distance offset from the light source in the image. Further, as the code is retrieved by processing the image, the position of the light source in the image may be processed already, hence it may be computationally efficient to define the location as a position relative to a position of the light source in the image.

In an embodiment, processing the image into a processed image comprises positioning navigation information at the location in the image, wherein the location is defined as a position in the image coinciding with the lighting characteristic of the light source in the image; and wherein the light source is part of street lighting infrastructure. It is advantageous to provide navigation information at the position in the image coinciding with the position of the light source in the image, because, as the light source is part of street lighting infrastructure, the navigation information is positioned at the most ergonomic position in the image.

The invention further relates to a computer program product. Hence, the invention provides a computer program product for a computing device, the computer program product comprising computer program code to perform the method of any one of the methods according to the present invention when the computer program product is run on a processing unit of the computing device. For example, said processing unit may also be the device according to the invention or a separate processor provided in the device. Performing abovementioned method by means of the computer program product may include only the features of the method implementable by means of a computer program product.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In further aspects, the invention may be a device for positioning information at a location in an image, the device comprising: a detector for recording the image, the image comprising a light source, wherein a lighting characteristic of the light source comprises a code indicative of a class of information and the location where to position the information in the image; a processor arranged for processing the image to retrieve the code, retrieving the information indicated by the class of information, retrieving the location indicated by the code, and processing the image into a processed image by positioning the information at the location in the image; and an image rendering device for rendering the processed image.

In further aspects, the invention may provide a device for positioning information at a location in an image, the device comprising: a detector for recording the image, the image comprising a light source, wherein a lighting characteristic of the light source comprises a code indicative of a classifier and the location where to position the information in the image; a processor arranged for processing the image to retrieve the code, retrieving the classifier indicated by the code, retrieving information indicated by the classifier, retrieving the location indicated by the code, and processing the image into a processed image by positioning the retrieved information (i.e. indicated by the classifier) at the location in the image; and an image rendering device for rendering the processed image.

In an embodiment, said light source contains a code indicative of a classifier and the location where to position the information in the image. Hence, the code may merely comprise said classifier and said location information.

The above said class or said classifier may alternatively be phrased as a string, a label, a tag, a group identifier, a selection, a subgroup.

The embodiments of the first object of the invention, as indicated above, may mutatis mutandis be applied to said further aspects above. Said further aspects of the invention may similarly be applied in a method according to the invention, wherein the steps of the method are associated with the features of said further aspects.

In yet further aspects, the invention may provide a device for positioning information at a corrected location in an processed image, the device comprising: a detector for recording an image, the image comprising a light source, wherein a lighting characteristic of the light source comprises a code indicative of a class of the information and the location where to position the information of said (particular) class in the processed image; and a processor arranged for processing the image to retrieve the code, retrieving the class of information indicated by the code, retrieving the location indicated by the code, obtaining the information of said (particular) class, processing the image into the processed image by positioning the information of said (particular) class in the processed image; and an image rendering device for rendering the processed image.

In an embodiment thereof, said device is provided, wherein the code is further indicative of the corrected location where to position the information in the image, wherein the corrected location where to position the information in the processed image is further dependent on a physical parameter of the device; the processor is further arranged for retrieving a physical parameter of the device; and processing the image into a processed image by positioning the information of said (particular) class at the corrected location in the processed image, wherein the location is further dependent on the physical parameter.

In an embodiment, the physical parameter is one of, location of the device, velocity of the device, and orientation of the device. Alternatively, the usage of the device may also be a physical parameter. Yet alternatively, said physical parameter may be a battery level of the device, or an application mode of the device, such as e.g. a discrete mode. In yet further aspects, the invention may provide a device for positioning information at a corrected location in an processed image, the device comprising: a detector for recording an image, the image comprising a light source, wherein a lighting characteristic of the light source comprises a code indicative of a classifier of the information and the corrected location where to position the information in the image; and a processor arranged for processing the image to retrieve the code, retrieving the classier indicated by the code, retrieving the corrected location indicated by the code, obtaining the information by only retrieving information comprising said classifier, processing the image into a processed image by positioning the information at the corrected location in the processed image; and an image rendering device for rendering the processed image.

Again, the embodiments of the first object of the invention, as indicated above, may mutatis mutandis be applied to said further aspects above. Said further aspects of the invention may similarly be applied in a method according to the invention, wherein the steps of the method are associated with the features of said further aspects.

All in all, the present application provides an invention wherein a device according to the invention is prompted by the lighting characteristic of the light source to position a particular type of information comprising/belonging to a particular class/group/label/etc., as indicated by the light source, at a location in the image indicated by the code emitted by the light source and/or dependent on a physical parameter of the device. The information being of a particular classification or comprising a classifier may apply to aspects and embodiments of the invention.

The embodiments provided to a first object of the invention may mutatis mutandis be provided for the other objects of the invention.

BRIEF DESCRIPTION OF THE DRAWINGS

The invention will now be further elucidated by means of the schematic non-limiting drawings:

FIG. 1B also depicts simultaneously an embodiment of a system for positioning information at a location in an image, wherein the system comprises a device according to the invention and a light source. FIG. 1B also depicts simultaneously such a light source, according to the invention.

DETAILED DESCRIPTION OF THE EMBODIMENTS

As mentioned, an improved device is provided for positioning information at a location in an image. Said device utilizes a light source comprised within a recorded image to determine what information is to be positioned where in a processed image. Such a processed image may e.g. be used in an augmented reality view. Thus, said processed image and/or said augmented reality view may be advantageously managed by a light source to declutter and/or to layout information. As a result, an automated, a more effective, and a more efficient device is provided for positioning information at a location in an image, hence for managing a view, e.g. an augmented reality view.

Figure 1A:
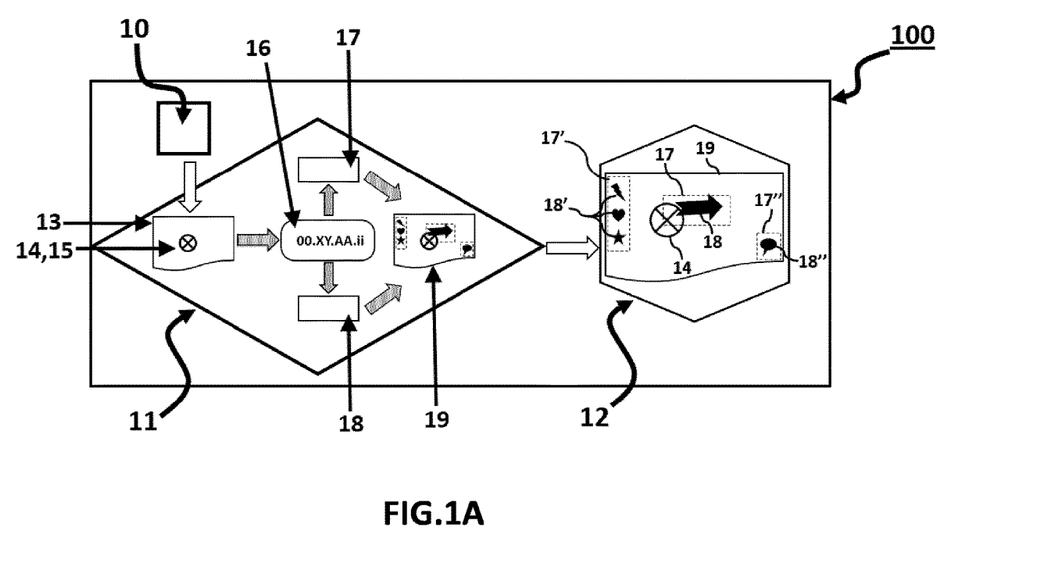
FIG. 1A depicts schematically an embodiment of a device for positioning information at a location in an image, the device comprising a detector, a processor and an image rendering device.
Figure 1B:
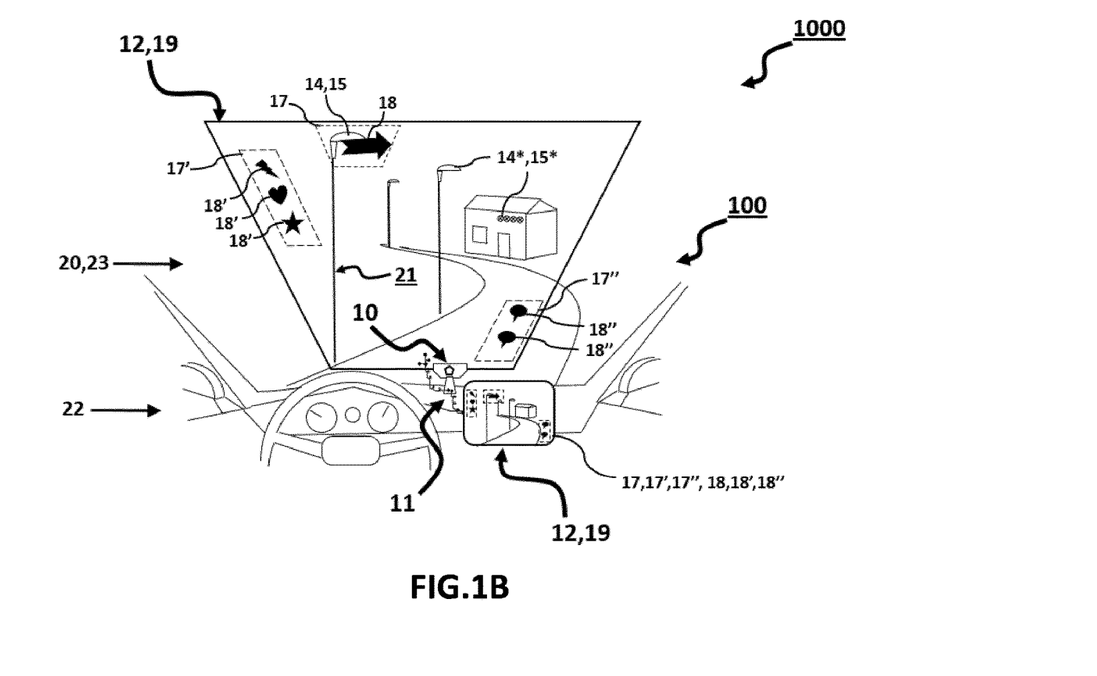
FIG. 1B depicts schematically a perspective view thereof.

FIG. 1A and FIG. 1B depict schematically, by non-limiting example, an embodiment of a device 100 for positioning information 18 at a location 17 in an image 13, ultimately providing a processed image 19. The device 100 comprises a detector 10, a processor 11 and an image rendering device 12. The detector 10, the processor 11 and the image rendering device 12 are separate components connected by a wired connection. Alternatively, said components may be integrated into a single body of a device. Yet alternatively, said components may be separate, but comprising a transceiver to communicate with each other, e.g. the detector, processor and/or image rendering device communicating by wireless connection such as Wi-Fi, Bluetooth, ZigBee or RF.

Here, said device 100 is part of an augmented reality device of a vehicle 22, which provides an augmented reality view on a display, and/or provides an augmented reality view onto a heads-up display of a windscreen 20 of the vehicle 22 by projecting the augmented reality view onto said heads-up display. Both are schematically depicted in FIG. 1B with the reference number twelve of the image rendering device 12. The processor 11 of the device 100 is autonomous and standalone, but may alternatively be part of a processor of the vehicle 22 or a device coupled to the vehicle 22 such as a navigation device or a computer. Said heads-up display may itself comprise a transparent or translucent projection screen, wherein part of reality 23 is seen through the heads-up display. Alternatively, said device may also be part of a virtual reality device, a projector device, a smartphone, a smart glass, an interactive visor, a navigation device, or a tablet. Said display may be a touchscreen, a 3-D screen or a holographic display. Alternatively, said image rendering device may be a projection device, wherein a projection may be provided on e.g. a glass, a lens, or an eye. In the case of the heads-up display, the processor 11 processes the image 13 into a processed image by making the image fully transparent, such that reality 23 may be seen through the heads-up display, while augmented features may be projected thereon.

Referring to FIG. 1A and FIG. 1B, the detector 10 records the image 13. The detector is a photodetector, more specifically a camera. Alternatively, said detector may be extended with additional sensors such as for sensing optics, radiofrequencies and/or thermal features, which may provide an alternative image comprising said sensed features. Said image 13 is a representation of reality 23, i.e. a video comprising a format and a size. The image 13 depicts, in FIG. 1B for example, the real view 23 as seen through the windscreen 20 of the vehicle 22. Here, the recording of the real view 23 comprises a lighting infrastructure comprising a plurality of light poles. Each light pole may comprise one (or at least one) light source. The image 13 comprises a light pole 21, wherein the light pole 21 comprises the light source 14. A lighting characteristic 15 of the light source 14 comprises a code 16 indicative of the information 18 and the location 17 where to position the information 18 in the image 13. Alternatively, other light sources comprising other lighting characteristics may be recorded, such as a wall washer of a house having a wall washing lighting characteristic, referred to respectively as reference number 14* and 15* in FIG. 1B. Said wall washing lighting characteristic may comprise the code in color coding.

The light source 14 is a semiconductor lighting device emitting light having a lighting characteristic 15. The lighting characteristic 15 is modulated visible light. Alternatively, the emitted light may be within the Radio Frequency spectrum, or the Infrared spectrum of light. Hence, here the emitted light and corresponding lighting characteristic 15 is coded light, which refers to a coding within the principle of Visible Light Communication (VLC). Thus, a signal is embedded within the visible light of the light source 14 by modulating the intensity according to a suitable modulation technique. Alternatively, other properties of the light, such as the color, may be modulated according to a coding scheme. Yet alternatively, the light source 14 may be characterized by emitting a single color continuously. A single color may be indicative of a code.

As mentioned, the lighting characteristic 15 of the light source 14 comprises a code 16 indicative of the information 18 and the location 17 where to position the information 18 in the image 13. The processor 11 processes the image 13 to retrieve the code 16, subsequently to retrieve the information 18 and the location 17, both as indicated by the code 16. Furthermore, the processor 11 is arranged for processing the image 13 into a processed image 19 by positioning the information 18 at the location 17 in the image 13. In FIG. 1B, the processor 11 is indirectly depicted within the dashboard of the vehicle 22. The processor 11 may have a working memory to temporarily store and process information, such as hosting database information.

The image rendering device 12 renders the processed image 19. Both the rendering on the heads-up display of the windscreen of the vehicle 22, as well as the rendering on said display is depicted in FIG. 1B.

Still referring to the embodiment depicted in FIG. 1A and FIG. 1B, the location 17 is comprised within the code 16. The code 16 explicitly indicates, or defines, or determines, the location 17 where to position the information 18 in the image 13. More specifically: First, the location 17" is encoded in the code 16 with relative or general coordinates in relation to a recorded image. Here, said relative coordinates define the location 17" (i.e. right lower corner of recorded image 13) for positioning the information 18". Second, the location 17' is encoded in the code 16 as a general command to position the information 18' relatively at the most left 15% of the size of the recorded image 13. Third, the location 17 is directly comprised within the code 16 as a command string, wherein the location 17 is defined as a position relative to a position of the light source 14 or the lighting characteristic 15 in the image 13. The processor 11 recognizes said command string, which also may e.g. be an identifier of the light source, and performs the processing steps to identify the position of the light source 14 in the image 13 and to position the information 18 relative to a position of the light source in the image 13. As the code 16 is already detected within the image 13, the mentioned processing steps may be computationally efficient. Here, the location 17 is defined as a position in the image 13 coinciding with the position of the light source 14 in the image. Alternatively, other examples or combinations on how the code may comprise the location may be envisioned. Alternatively, the information may be coinciding with the position of the lighting characteristic in the image, if the lighting characteristic is e.g. a light footprint of the light source. Yet alternatively, the location may be defined as a position relative to an edge of the image rendering device, such that said edge may be used as a reference point.

Furthermore, the code 16 is indicative of the information 18. Here, the code 16 explicitly indicates the type of the information 18. The processor 11 is arranged for retrieving said information 18 based on said code 16. Namely, here, the code 16 comprises a data string indicating the type of navigation information 18, device information 18', and/or communication information 18". The processor 11 now knows which type of information 18, 18', 18" needs to be retrieved and positioned at the respective location 17, 17', 17". Alternatively, said code may comprise a data string with an identifier of the light source. The processor may then retrieve the information, or type of the information, based on said identifier. Thus, an identifier of a light source placed at a crowded intersection may indicate to the processor the navigation information, which the device e.g. will position at most ergonomic position in the image to improve safety during e.g. an augmented reality view navigation. Yet alternatively, the code may comprise the content of the related information, such as the navigational content of the navigation information, e.g. the directions (or advertorials in case of advertorial information) itself.

Hence, as a result of the above, the device 100 is prompted by the code 16 to position navigation information 18 at the location 17 in the image 13, the location 17 which is at a position coinciding with a position of the light source 14 in the image 13. The content of the navigation information 18 is retrieved by the processor 11 internally or from a connected memory/processing unit. Further, as depicted in FIG. 1A and FIG. 1B, communication information 18" is positioned at the location 17", which is the lower right corner relative coordinates of the image 13; and device information 18' is positioned at the location 17', which is the left 15% of the image 13. Consequently, the processed image 19 provides a more ergonomic, a safer, and a more efficient augmented reality view, as information is positioned at the respective locations instead of cluttering the view.

Still referring to FIG. 1B, but in a different embodiment, a system 1000 is provided for positioning information 18 at a location 17 in an image 13, the system 1000 comprising the device 100 according to the invention, and the light pole 21 comprising the light source 14. The light pole may be part of a lighting infrastructure.

Figure 2:
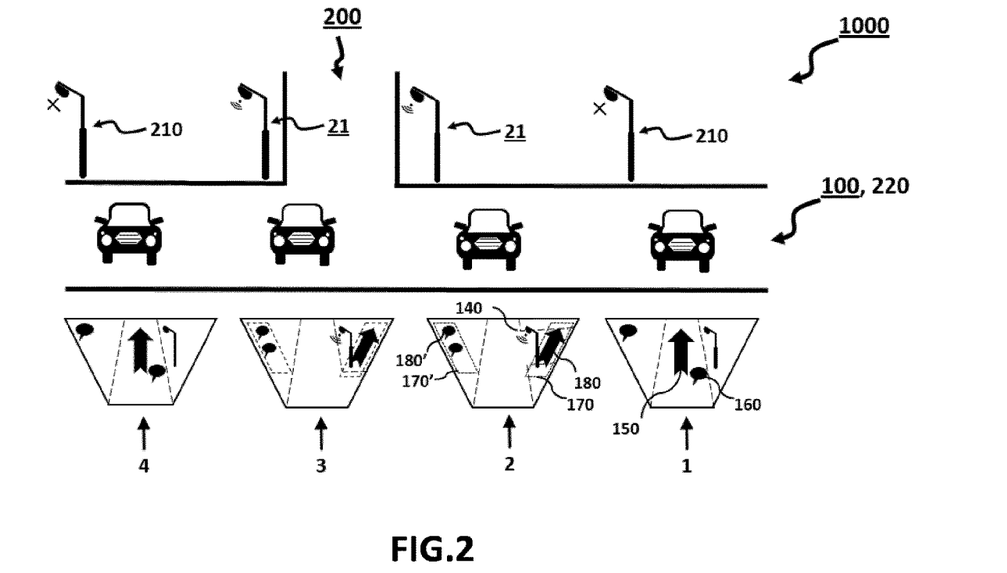
FIG. 2 depicts schematically an application of the embodiment of the system depicted in FIG. 1B.

FIG. 2 depicts schematically, by non-limiting example, an application of the embodiment of the system depicted in FIG. 1B. A traffic situation 200 is depicted with a road comprising a hazardous intersection. A vehicle 220 navigates on said road and crosses the hazardous intersection. Four moments in time 1, 2, 3, 4 are depicted corresponding to the navigated path of the vehicle 220. The vehicle 220 comprises the device 100 according to the invention, which is part of an augmented reality view of the windscreen of the vehicle 220, partly similar to the embodiment depicted in FIG. 1A and FIG. 1B.

At the first moment in time 1, the vehicle 220 has not yet encountered the hazardous intersection and navigates on a straight road section. The detector of the device 100 according to the invention records a view, which comprises at the first moment in time 1 a regular light source 210 not according to the invention. Due to a plurality of information, the augmented reality view at the first moment in time 1 is cluttered with navigation information 150, such as an arrow indicating directions, and communication information 160, such as pop-up messages comprising texts or mails. Alternatively, other types of information may be present in the augmented reality view, such as advertorial or touristic information.

At the second moment in time 2, the vehicle 220 is approaching the hazardous intersection. A light pole 21 according to the invention (i.e. the system 1000) is present at the crossing of the hazardous intersection. A lighting characteristic of said light pole 21 light source, as elucidated before in the description, comprises a code 140 indicative of the information 180, 180' and the respective location 170, 170' where to position the information 180, 180' in an image, i.e. here the image is part of the augmented reality view rendered on the windscreen of the vehicle 220 by means of the device 100. Thus, due to the system 1000, the light source 21, and the device 100, the navigation information 180 and the communication information 180', which both previously cluttered the view, are now respectively positioned at the ultimate 15% of the right side and the ultimate 15% left side of the windscreen (i.e. by the image rendering device). Alternatively, other suitable locations may be envisioned according to ergonomics, view management or safety. Thus, due to the invention, the system 1000 ensures an uncluttered clear view of the intersection when the vehicle is navigating by the hazardous intersection at the second moment in time 2. This means that a user of the augmented reality view in the vehicle may be provided with a safer overview of the traffic situation 200 at the hazardous intersection. This may also apply for autonomous vehicles, wherein a user is using the augmented reality view to partly work from the vehicle (e.g. answering mails, calls, writing, editing, etc.), such that the augmented reality view is decluttered automatically whenever a clear view of a road is necessary due to safety regulations.

At the third moment in time 3, the vehicle 220 is leaving the hazardous intersection, and as the light source 21 is still according to the invention, the situation enabled by the invention at the second moment in time applies mutatis mutandis to the third moment in time 3. At the fourth moment in time 4, the vehicle 220 is no longer at the hazardous intersection, and as the light source 210 is not according to the invention, the situation (without the invention enabled) at the first moment in time 1 applies mutatis mutandis to the fourth moment in time 4. Traffic controlling institutions may, for example, provide a light pole 21 comprising a light source according to the invention at places wherein efficient control of an augmented reality view of e.g. a vehicle of a user using an augmented reality device is desired.

Figure 3A:
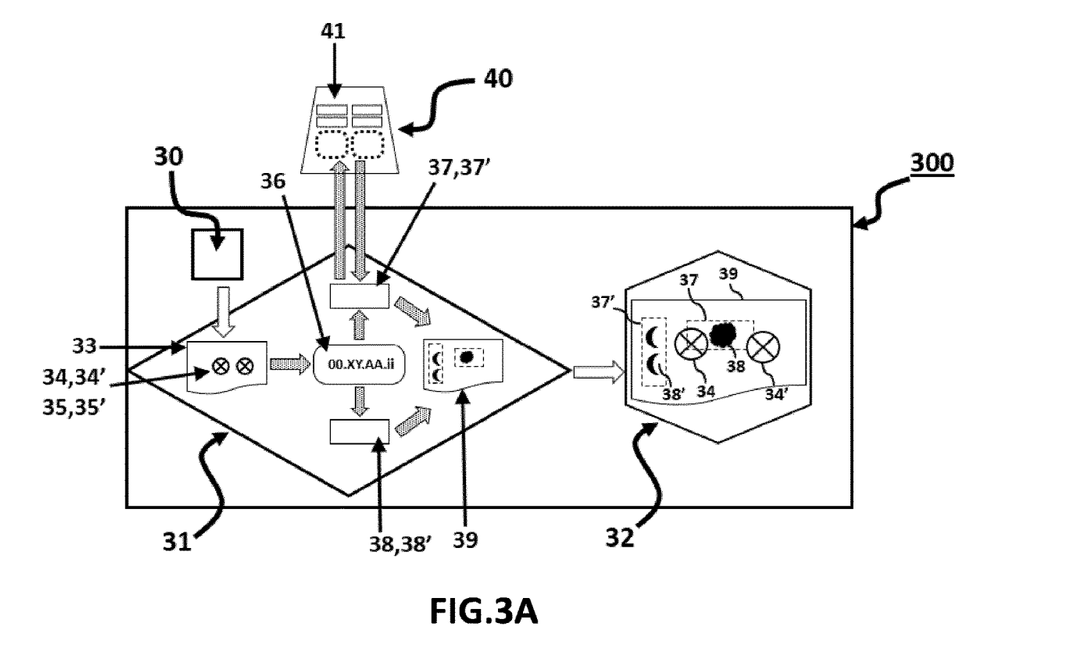
FIG. 3A depicts schematically an embodiment of a device for positioning information at a location in an image, the device comprising a detector, a processor and an image rendering device, wherein the processor is arranged for retrieving the location by accessing a database.
Figure 3B:
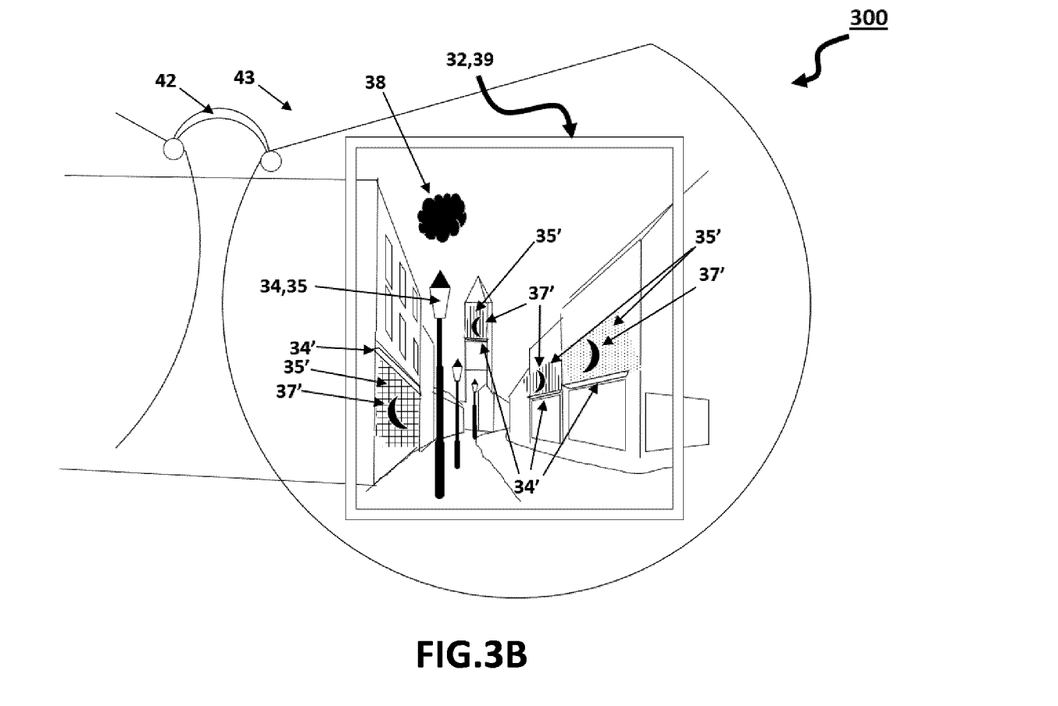
FIG. 3B depicts schematically a perspective view thereof.

FIG. 3A and FIG. 3B depict schematically, by non-limiting example, an embodiment of a device 300 for positioning information 38, 38' at a location 37, 37' in an image 33, the device 300 comprising a detector 30, a processor 31 and an image rendering device 32, which is partly similar to the embodiment in FIG. 1A and FIG. 1B, but now wherein the processor 31 is arranged for accessing a database 40 and for retrieving the location 37, 37' from the database 40.

The device 300 is part of a smart glass 42 providing an augmented reality view of reality 43 by means of an image rendering device projecting images onto a transparent projection element, such as a glass. The reality 43 is a crowded shopping street in a city, the street comprising a plurality of shops with shopping windows. Each shop is sending wireless information to the smart glass 42, hence rendering a cluttered view of the augmented reality view (not depicted). The present invention, as embodied in FIG. 3A and FIG. 3B declutters and improves the augmented reality view. Each wall above a shopping window, or the shopping window itself, is illuminated with a wall washer 34' providing a wall washing effect 35'. Furthermore, a light pole 34 in the shopping street is providing coded light 35.

Referring to FIG. 3A and FIG. 3B, the detector 30 records the image 33. The image 33 comprises a light source 34, 34' (i.e. e.g. a wall washer or a light pole) wherein the lighting characteristic 35, 35' of the light source comprises a code 36 indicative of the information 38, 38' and the location 37, 37' where to position the information 38, 38' in the image 33. The processor 31 processes the image 33 to retrieve the code 36. The code 36 comprises an identifier identifying the light source 34, 34' and a data string indicating the type of information 37, 37' corresponding to said identifier. The processor 31 retrieves the information indicated by the code 36, which is advertorial information 38 corresponding to the type of advertorial information as indicated by the data string. Alternatively, said information may be touristic information 38'. Further, the processor retrieves the location 37, 37' indicated by the code 36 by accessing a database 40 comprising a list 41 indicating locations corresponding to codes, i.e. identifiers here; and retrieving the location 37, 37' corresponding to the code 36 from the list 41 in the database 40. Again, similar to the embodiment depicted in FIG. 1A and FIG. 1B, the processor processes the image 33 into a processed image 39 by positioning the information 38, 38' at the location 37, 37' in the image 33.

Referring to FIG. 3A and FIG. 3B, the device 300 comprises the database 40. Alternatively, said database may be external to the device 300, wherein the database may be connected by wired or wireless connection to the device 300; such as e.g. Wi-Fi, BLE, ZigBee, RF, or VLC.

Still referring to FIG. 3A and FIG. 3B, the information is touristic information 38 and advertorial information 38'. The corresponding location 37, 37', as retrieved from the database 40, is respectively coinciding with the lighting effect 35' (i.e. the wall washing effect) of the (wall washing) light source 34' in case of the advertorial information 38'; and located with an offset above the light pole light source 34, the offset being a distance equal to 10% of the height of the image 33. Said touristic information 38 may be the weather condition, or the opening hours of the local church; said advertorial information 38' may be the advertisements of the shops in the shopping street.

Alternatively, navigation information may be anchored to the light source of the light pole, as this may be the most ergonomic position in the city infrastructure to anchor such information. Yet alternatively, advertorial information may be anchored to abris or shop windows. Yet alternatively, touristic information may be anchored to the upper part of the image, which may in most cases comprise the sky. Yet alternatively, city information may be anchored to façade lighting.

Hence, as a result of the above, the device 300 is prompted by the code 36 to position advertorial information 38' at the location 37' in the image 33, the location 37' which is at a position coinciding with the wall washing effect 35' of the wall washing light source 34 (i.e. façade lighting). Further, touristic information 38 is positioned at the location 38, which is an offset above the light pole light source 35. Alternatively, said touristic information may be positioned at a position relative to an edge of the image rendering device. Consequently, the processed image 39 provides a more ergonomic and a more efficient augmented reality view, as information is positioned at the shop locations instead of cluttering the view.

Figure 4:
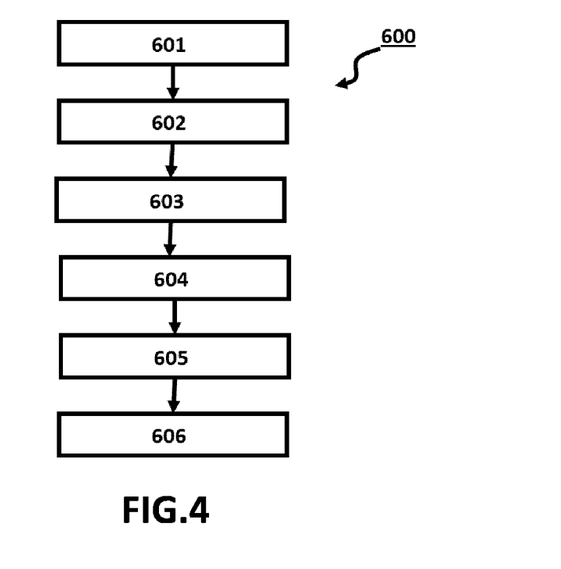
FIG. 4 depicts schematically, within a flowchart, an embodiment of a method for positioning information at a location in an image.

FIG. 4 depicts schematically, by non-limiting example, a flowchart of an embodiment of a method 600 for positioning information at a location in an image. The method, as performed with a detector, image rendering device and a processor according to the invention, comprises (601) recording the image, the image comprising a light source, wherein a lighting characteristic of the light source comprises a code indicative of navigation information and the location where to position the navigation information in the image. Alternatively, other types of information may be indicated by the code, such as advertorial information, device information, communication information, city information, touristic information, etc. The method further comprises (602) processing the image to retrieve the code; (603) retrieving the navigation information indicated by the code. This retrieving may be done by the processor by accessing a memory wherein said navigation information is stored, because the only requirement for retrieving such information is knowing what type or which information to retrieve, hence this is indicated by the code. The method further comprises (604) retrieving the location indicated by the code; (605) processing the image into a processed image by positioning the navigation information at the location in the image; (606) displaying the processed image. In an example, the step (605) of processing the image into a processed image comprises positioning navigation information at a position in the image coinciding with the lighting characteristic of the light source in the image; wherein the light source is part of street lighting infrastructure.

In an embodiment, not depicted, the method depicted in FIG. 4 further comprises: (607) retrieving the location indicated by the code by accessing a database comprising a list indicating locations corresponding to codes; and (608) retrieving the location corresponding to the code from the list in the database.

In an alternative embodiment, not depicted, the method depicted in FIG. 4 further comprises (608) retrieving the location indicated by the code is done by: processing the code; wherein the location is comprised within the code.

The invention claimed is:

1. A device for positioning information at a location in an image, the device comprising:
   a detector for recording the image, the image comprising a light source, wherein a lighting characteristic of the light source comprises a code indicative of the information and the location where to position the information in the image, wherein the location is defined as a position relative to a position of the light source in the image;
   a processor arranged for
      processing the image to retrieve the code,
      retrieving the information indicated by the code,
      retrieving the location indicated by the code,
      processing the image into a processed image by positioning the information at the location in the image;
   an image rendering device for rendering the processed image,
   wherein the location where to position the information in the image is further dependent on a physical parameter of the device, the physical parameter comprising a usage of the device.

2. The device according to claim 1, wherein the processor is arranged for retrieving the location indicated by the code by
   accessing a database comprising a list indicating locations corresponding to codes; and
   retrieving the location corresponding to the code from the list in the database.

3. The device according to claim 1, wherein the processor is arranged for retrieving the location indicated by the code by
   processing the code; wherein the location is comprised within the code.

4. The device according to claim 1, wherein the information comprises at least one of: navigation information, touristic information, advertorial information, communication information, and device information.

5. The device according to claim 1, wherein the location is defined as a position in the image coinciding with the position of the light source in the image.

6. The device according to claim 1, wherein the location is defined as a position relative to an edge of the image rendering device.

7. The device according to claim 1, wherein processing the image into a processed image comprises positioning navigation information at the location in the image, wherein the location is defined as a position in the image coinciding with the position of the light source in the image; and wherein the light source is part of street lighting infrastructure.

8. A system for positioning information at a location in an image, the system comprising
   the device according to claim 1, and
   the light source.

9. A method of positioning information at a location in an image, the method comprising:
   recording the image, the image comprising a light source, wherein a lighting characteristic of the light source comprises a code indicative of the information and the location where to position the information in the image, wherein the location is defined as a position relative to a position of the light source in the image;
   processing the image to retrieve the code;
   retrieving the information indicated by the code;
   retrieving the location indicated by the code;
   processing the image into a processed image by positioning the information at the location in the image;
   displaying the processed image,
   wherein the location where to position the information in the image is further dependent on a physical parameter of a device for positioning information at a location in an image, the physical parameter comprising a usage of the device.

10. The method according to claim 9 comprising, wherein the retrieving the location indicated by the code is performed by:
   accessing a database comprising a list indicating locations corresponding to codes; and
   retrieving the location corresponding to the code from the list in the database.

11. The method according to claim 10 comprising, wherein the retrieving the location indicated by the code is performed by:
   processing the code; wherein the location is comprised within the code.

12. The method according to claim 9, wherein the processing the image into a processed image comprises positioning information required for positioning, navigation and/or location based services at the location in the image, wherein the location is defined as a position in the image coinciding with the lighting characteristic of the light source in the image; and wherein the light source is part of street lighting infrastructure.

13. A non-transitory computer-readable medium comprising computer program code that, when executed on one or more processors, is configured to perform the method of claim 9.

* * * * *